(12) United States Patent
Tsai et al.

(10) Patent No.: US 9,053,132 B2
(45) Date of Patent: *Jun. 9, 2015

(54) SYSTEM, METHOD AND COMPUTER PROGRAM PRODUCT FOR PROVIDING A TEAM OBJECT IN ASSOCIATION WITH AN OBJECT

(75) Inventors: Benjamin Tsai, San Francisco, CA (US); Michael Tang, Petaluma, CA (US); Marco Casalaina, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,053

(22) Filed: Apr. 13, 2012

(65) Prior Publication Data
US 2012/0203801 A1 Aug. 9, 2012

Related U.S. Application Data

(63) Continuation of application No. 12/559,265, filed on Sep. 14, 2009.

(60) Provisional application No. 61/096,555, filed on Sep. 12, 2008.

(51) Int. Cl.
| | | |
|---|---|---|
| G06F 15/16 | (2006.01) |
| G06F 15/173 | (2006.01) |
| G06F 17/30 | (2006.01) |
| G06F 21/62 | (2013.01) |
| G06Q 10/10 | (2012.01) |

(52) U.S. Cl.
CPC ...... *G06F 17/30292* (2013.01); *G06F 21/6218* (2013.01); *G06Q 10/10* (2013.01)

(58) Field of Classification Search
CPC .................. G06F 21/6218; F06F 17/30292
USPC .......................................... 709/206, 223, 226
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 60/828,192, filed Oct. 4, 2006.

(Continued)

*Primary Examiner* — Patrice Winder
*Assistant Examiner* — Angela Widhalm
(74) *Attorney, Agent, or Firm* — Zilka-Kotab, PC (57) ABSTRACT

In accordance with embodiments, there are provided mechanisms and methods for providing a team object in association with an object. These mechanisms and methods for providing a team object in association with an object can allow for centralized management of a team in association with an object. For example, members of the team may be automatically identified (e.g. without manual intervention) for receiving notifications in association with an object.

17 Claims, 5 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,174,348 B1 | 2/2007 | Sadhu et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,558,784 B2 | 7/2009 | Orumchian et al. |
| 7,568,151 B2 * | 7/2009 | Bargeron et al. ............ 715/231 |
| 7,596,625 B2 | 9/2009 | Manion et al. |
| 7,620,655 B2 | 11/2009 | Larsson et al. |
| 7,644,089 B2 | 1/2010 | Stewart et al. |
| 7,653,733 B2 * | 1/2010 | Beyda .................... 709/229 |
| 7,668,830 B2 * | 2/2010 | Hakala .................... 713/154 |
| 7,698,160 B2 | 4/2010 | Beaven et al. |
| 7,774,504 B2 | 8/2010 | Chene et al. |
| 7,779,039 B2 | 8/2010 | Weissman et al. |
| 7,808,378 B2 | 10/2010 | Hayden |
| 7,814,025 B2 * | 10/2010 | Roever et al. ................ 705/65 |
| 7,949,684 B2 | 5/2011 | Brooks et al. |
| 7,991,790 B2 | 8/2011 | Barker et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0064807 A1 | 4/2003 | Walker et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0213283 A1 | 10/2004 | Ohkubo et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0114475 A1 | 5/2005 | Chang et al. |
| 2005/0165859 A1 | 7/2005 | Geyer et al. |
| 2005/0223022 A1 | 10/2005 | Weissman et al. |
| 2005/0278294 A1 | 12/2005 | Beartusk et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2006/0223600 A1 | 10/2006 | Wisdom et al. |
| 2007/0050467 A1 * | 3/2007 | Borrett et al. ................ 709/213 |
| 2007/0106744 A1 | 5/2007 | Bicheno et al. |
| 2007/0198317 A1 | 8/2007 | Harthcryde et al. |
| 2007/0220005 A1 | 9/2007 | Castro Castro et al. |
| 2007/0283278 A1 | 12/2007 | Hupfer et al. |
| 2008/0008106 A1 | 1/2008 | Boberg et al. |
| 2008/0010243 A1 | 1/2008 | Weissman et al. |
| 2008/0052203 A1 | 2/2008 | Beyer et al. |

(56) References Cited

U.S. PATENT DOCUMENTS

| | | |
|---|---|---|
| 2008/0162551 A1 | 7/2008 | Geyer et al. |
| 2008/0209503 A1* | 8/2008 | Hess et al. ............... 726/1 |
| 2008/0249972 A1 | 10/2008 | Dillon |
| 2009/0037211 A1 | 2/2009 | McGILL et al. |
| 2009/0049053 A1* | 2/2009 | Barker et al. ............ 707/10 |
| 2009/0063415 A1 | 3/2009 | Chatfield et al. |
| 2009/0098940 A1 | 4/2009 | Sangberg |
| 2009/0100342 A1 | 4/2009 | Jakobson |
| 2009/0177744 A1 | 7/2009 | Marlow et al. |
| 2009/0182592 A1* | 7/2009 | Ballaro et al. ............ 705/7 |
| 2009/0234667 A1 | 9/2009 | Thayne |
| 2012/0197948 A1 | 8/2012 | Tsai et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0254241 A1 | 9/2013 | Tsai et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |

OTHER PUBLICATIONS

Microsoft Press, "Microsoft Computer Dictionary," Mar. 15, 2002, 5th edition, pp. 14-15, 177, 437, 470-472.

Non-Final Office Action from U.S. Appl. No. 13/445,844, dated May 23, 2013.

Final Office Action from U.S. Appl. No. 13/445,844, dated Sep. 13, 2013.

Advisory Action from U.S. Appl. No. 13/445,844, dated Dec. 9, 2013.

Notice of Allowance from U.S. Appl. No. 12/559,265, dated Nov. 12, 2014.

Non-Final Office Action from U.S. Appl. No. 13/887,219, dated Oct. 1, 2014.

Non-Final Office Action from U.S. Appl. No. 13/445,844, dated Jan. 14, 2015.

* cited by examiner

SYSTEM, METHOD AND COMPUTER PROGRAM PRODUCT FOR PROVIDING A TEAM OBJECT IN ASSOCIATION WITH AN OBJECT

CLAIM OF PRIORITY

This application is a continuation of U.S. application Ser. No. 12/559,265, filed Sep. 14, 2009, which claims the benefit of U.S. Provisional Patent Application 61/096,555 entitled "Method and System for Providing Case Teams in an On-Demand CRM System," by Tsai et al., filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to interested parties associated with objects, and more particularly to defining interested parties in association with the objects.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, parties interested in aspects of an object (e.g. a data object), such as modifications to the object, issues with the object, etc. have generally been managed in a de-centralized manner. For example, parties with an interest in receiving notifications about a modification to an object, etc. have traditionally been provided with such notification by manually selecting each party to notify each time a notification is to be made.

BRIEF SUMMARY

In accordance with embodiments, there are provided mechanisms and methods for providing a team object in association with an object. These mechanisms and methods for providing a team object in association with an object can allow for centralized management of a team in association with an object. For example, members of the team may be automatically identified (e.g. without manual intervention) for receiving notifications in association with the object.

In an embodiment and by way of example, a method is provided for providing a team object in association with an object. In use, a request to add a team to an object managed by a multi-tenant on-demand database service is received. Further, a team object associated with the object is created for adding the team to the object.

While the present invention is described with reference to an embodiment in which techniques for providing a team object in association with an object are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for providing a team object in association with an object.

To date, parties interested in aspects of an object have generally been managed in a de-centralized manner, such that identification of the parties for sending notifications to the parties has generally been performed manually. Thus, mechanisms and methods for providing a team object in association with an object. These mechanisms and methods for providing a team object in association with an object can allow for centralized management of a team in association with an object, for example, such that members of the team may be automatically identified (e.g. without manual intervention) for receiving notifications in association with the object.

Next, mechanisms and methods for providing a team object in association with an object will be described with reference to exemplary embodiments.

Figure 1:
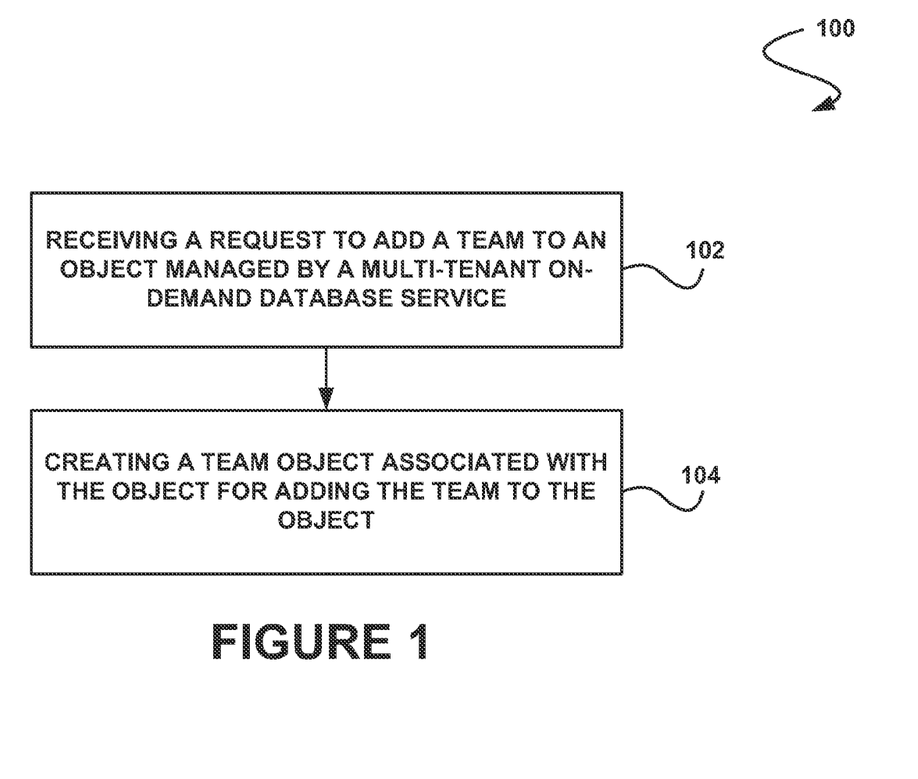
FIG. 1 shows a method for providing a team object in association with an object in accordance with one embodiment.

FIG. 1 shows a method 100 for providing a team object in association with an object, in accordance with one embodiment. As shown in operation 102, a request to add a team to an object managed by a multi-tenant on-demand database service is received. With respect to the present description, the multi-tenant on-demand database service may include any service that relies on a database system that is accessible over a network, in which various elements of hardware and software of the database system may be shared by one or more tenants (e.g. organizations, customers, users, etc.) of the multi-tenant on-demand database service. For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

Accordingly, the object may be managed by the multi-tenant on-demand database service such that the object is stored by and/or otherwise made accessible to by the multi-tenant on-demand database service (e.g. for modifying the object, using the object, etc.). Optionally, the object may be stored by the multi-tenant on-demand database service for use by at least one tenant of the multi-tenant on-demand database service.

In one embodiment, the object may include a data object. In another embodiment, the object may be of a particular type. For example, the object may store data of the particular type. In one exemplary embodiment, the object may include a case object (e.g. an object indicative of a case).

Additionally, the team requested to be added to the object may include a team of members, such as a single member or a plurality of members. To this end, the request may be to add members to the object. More information regarding such members will be described in more detail below.

In one embodiment, the request may be received by the multi-tenant on-demand database service from a tenant of the multi-tenant on-demand database service (e.g. via a network). In another embodiment, a user associated with the tenant (e.g. provided with access to the multi-tenant on-demand database service via the tenant) may include any user with permissions to modify the object. For example, the user may include an administrator (e.g. owner, etc.) of the object. In yet another embodiment, the request may be received utilizing an interface (e.g. user interface) of the multi-tenant on-demand database service.

Further, a team object associated with the object is created for adding the team to the object. See operation 104. In the context of the present description, the team object may include any object defining the team requested to be added to the object. Accordingly, in one embodiment, the team object may be created by defining the team and including the defined team in a single team object associated with the object. As an option, the team object may be created utilizing a user interface (e.g. of the multi-tenant on-demand database service). In one embodiment, the team object may be created (and subsequently modified and/or deleted) by any user with full access to the object, such as an owner of the object, the owner's managers, administrators, the multi-tenant on-demand database service (e.g. via assignment rules described below), etc.

For example, the team object may define the team by defining at least one member (e.g. each member included in the team). In various embodiments, the members may include users (e.g. associated with a tenant of the multi-tenant on-demand database service), queues, customer portal users, partner portal users, contacts (e.g. without an associated user, such that the contact may not be associated with a tenant of the multi-tenant on-demand database service), etc. Thus, as an option, the members of the team may be defined in the team object by listing an identifier (e.g. name, etc.) of each member of the team in the team object.

As another example, the team object may define the team by assigning (e.g. in the team object) a role to each member defined in the team object. The role may be associated with responsibilities, permissions, etc. (e.g. with respect to the object). In various embodiments, the role may define notification settings for a member assigned to the role, sharing settings for a member assigned to the role, visibility for a member assigned to the role, etc., as described in more detail below. Table 1 illustrates an example of various roles that may be assigned to members of a team for defining a team object. It should be noted that such roles are set forth for illustrative purposes only, and thus should not be construed as limiting in any manner.

TABLE 1

| Role | Default? | Notification | Sharing | Visibility |
|------|----------|--------------|---------|------------|
| Support Rep | Y | All | Read/Write | Customer Portal |
| Engineer | N | All | Read | Private |
| Primary Customer Contact | N | Public Comments, Status Changes | Read | Customer Portal |
| Interested Party | N | Public Comments | Read | Customer Portal |

As noted above, notification settings may be defined for reach role. The notification settings may indicate the actions associated with the object of which a member assigned to the role is to be notified. For example, the notification settings of a role may indicate that a member assigned to the role is to be notified of email, comments, activities, and status changes (e.g. case closed, etc.) that are associated with the object. Of course, as an option, each role may be configured to prevent a member assigned to such role from receiving notifications regarding email, comments, activities, status changes, etc. that were initiated by that member. To this end, upon detecting an action associated with the object, a notification may optionally be sent to the member based on the notification settings assigned thereto via the role.

As also noted above, sharing settings may be defined for each role. The sharing settings may optionally only apply to the role if the member assigned to the role is a user (e.g. and not if the member is a contact, etc.). In various embodiments, the sharing settings may include no access permissions to the object, read only access permissions to the object, read and write access permissions to the object, and full access to the object. In one exemplary embodiment, a role indicative of an owner of the object may give a member of that role full access to the object, and thus may not necessarily be limited by the read-only, etc. sharing settings.

Further, as noted above, visibility settings may be defined for each role. The visibility settings may define whether a member of a particular role is visible to other members, the public, portal users, etc. For example, the visibility settings for a role may include internal only whereby the member assigned to the role is only visible to other members of the same portal as the member, internal and partner portals whereby the member assigned to the role is only visible to other members of the same portal as the member and members of portals that are partners to the portal of the member, internal and all portals whereby the member assigned to the role is visible to other members of the same portal as the member, members of portals that are partners to the portal of the member, and members of customer portals.

To this end, as described above, the team object may be created by defining members in the team object and by assigning within such team object each of such members to a role. Optionally, the members and/or roles may be manually configured. As another option, the members and/or roles may be selected from predefined members and/or roles.

Still yet, the team object may be created from one of a plurality of predefined team objects, in one embodiment. For example, the predefined team object may include a template of members and roles assigned to each member. As an option, the team object may be created from the predefined team object by referencing the predefined team object. In this way, any changes made to the predefined team object may be automatically propagated to the created team object. Of course, if the team object is defined using the predefined team object, it should be noted that any changes made directly to a member definition in the created team object may sever the reference between the member definition in the created team object and the member definition in the predefined team object, such that changes made to the member definition in the predefined team object may be prevented from being automatically propagated to the member definition in the created team object.

Moreover, the team object may be created based on predefined assignment rules. The predefined assignment rules may indicate for a particular object a predefined member to be automatically included in an associated team object, in one embodiment. For example, a predefined assignment rule may indicate that a member assigned to an owner role for the object (e.g. in a table of the multi-tenant database service, etc.) is to be automatically defined in the team object. Once the team object is created, the predefined assignment rules may further includes a rule for removing a member definition in the team object once the member is deactivated from the multi-tenant on-demand database service.

As another example, a predefined assignment rule may indicate that a member defined in another team object with a particular role is to be automatically added to the team object being created in association with the object. It should be noted that the other team object described above may include a team object associated with another object, such as an account, where the other object is optionally associated with the object for which the team object is being created.

The predefined assignment rule may also indicate the role to be assigned to such automatically added member. If the member defined in the other team object that is referenced by the predefined assignment rule is deleted from the other team object, the predefined assignment rule may optionally automatically be deleted by virtue of the reference therein to the member defined in the other team object that was deleted. Additionally, a member defined in the team object may be deleted if the member definition in the other team is modified or deleted.

In another embodiment, the predefined assignment rules may indicate for a particular object a predefined team object from which an associated team object is to be created. In one embodiment after the team object associated with the object has already been created, members defined by the team object may be replaced with members defined by the assignment rules (e.g. if the object is being reassigned). In another embodiment, after the team object associated with the object has already been created, members defined by the team object may be added to with members defined by the assignment rules. Of course, whether the member definition is replaced or added to, as described above, may depend on an option that is selected for the object.

Once the team object associated with the object is created, the team object may be utilized in any desired manner. For example, the team object may be utilized for automatically transmitting notifications to members defined in the team object in response to modifications, etc. to the object. In one embodiment, upon a particular type of modification made to the object (e.g. a comment added to the object, a change in status of the object, etc.), the team object may be utilized to automatically determine which role requires a notification for that particular type of modification and further which member is assigned to that role in the team object. Once the member is identified, the member may be accordingly notified of the modification made to the object.

As an option, the role assigned to the member may further define a time in which the member is to be notified of the modification made to the object. For example, the role may define that the member is to receive the notification immediately after the modification is made to the object or that the member is to receive the notification via a once-daily notification sent to the member which includes an aggregate of all notifications to be sent to the member that accumulated throughout that day.

Figure 2:
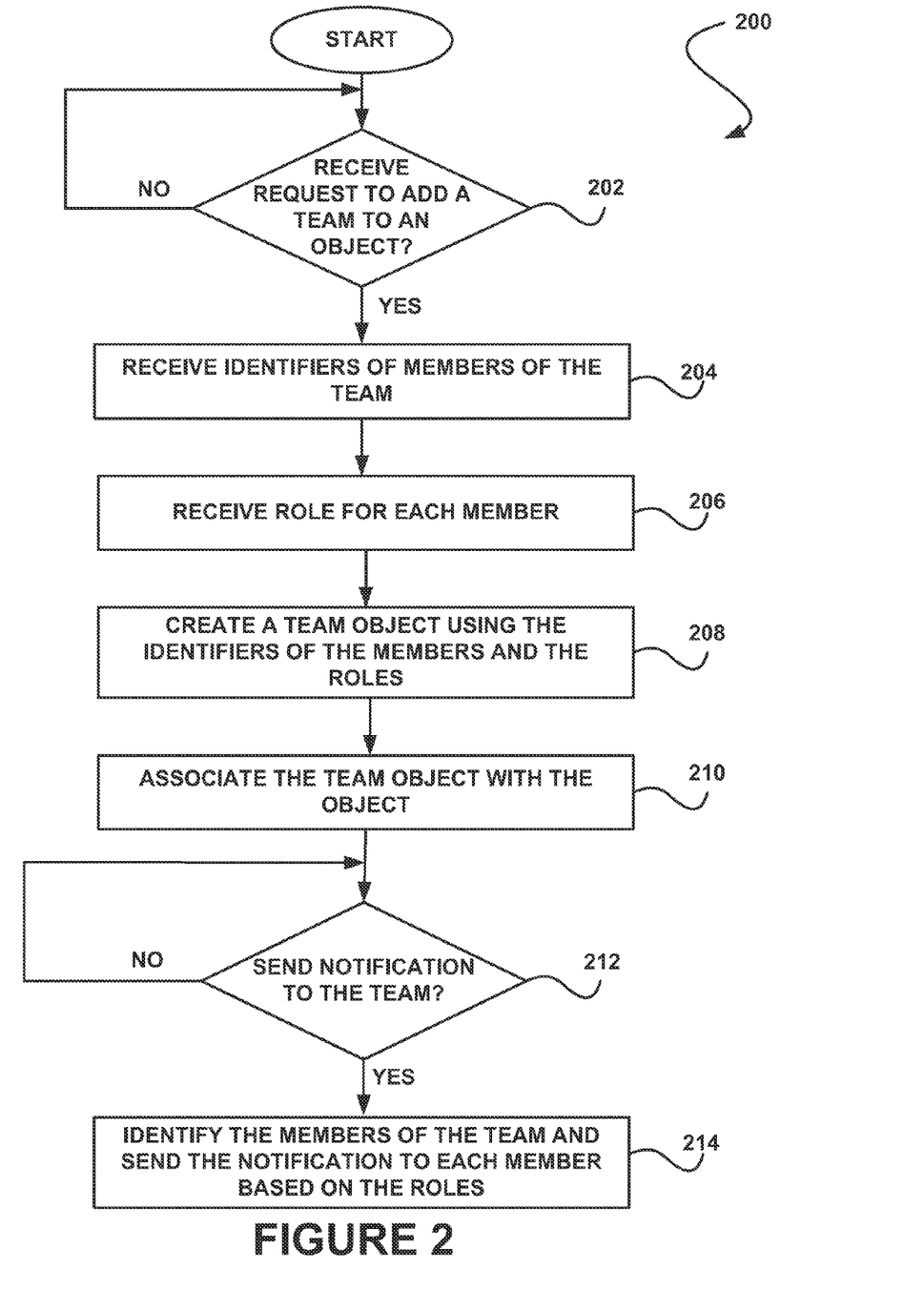
FIG. 2 shows a method for sending notifications to members of a team utilizing a team object, in accordance with another embodiment.

FIG. 2 shows a method 200 for sending notifications to members of a team utilizing a team object, in accordance with another embodiment. As an option, the present method 200 may be carried out in the context of the functionality of FIG. 1. Of course, however, the method 200 may be carried out in any desired environment. The aforementioned definitions may apply during the present description.

As shown in decision 202, it is determined whether a request to add a team to an object is received. In the context of the present description, the object is managed by a multi-tenant on-demand database service. To this end, the request may be received by the multi-tenant on-demand database service from a tenant of a multi-tenant on-demand database service.

In one embodiment, the request to add the team to the object may be received utilizing a user interface associated with the object. For example, the user interface may be utilized for managing the object. Further, the request to add the team may include any request to define team members to which notifications are to be sent in association with the management of the object.

If it is determined that the request to add the team is not received, the method 200 waits for such a request to be received. If, however, the request to add the team is received, identifiers of members of the team are received. See operation 204. Such identifiers may include names of the members and/or any other identifiers uniquely identifying the members. Optionally, the member identifiers may each identify an object representative of a member.

In one embodiment, the member identifiers may be received from a manual entry by the tenant. In another embodiment, the member identifiers may be each be received via selection from a predefined list of member identifiers available to be defined in the team. In yet another embodiment, the member identifiers may be received as a group via selection of a predefined team object (e.g. a team object template already including member identifiers).

In still yet another embodiment, the member identifiers may be received as a result of executing a rule which indicates the member identifiers to be defined in the team. Optionally, the rule may indicate which member identifiers to be defined in the team based on the object to which the team is requested to be added. Just by way of example, the rule may indicate that an owner of the object is to be automatically added to the team, such that upon execution of the rule, a member identifier of such owner may be received.

In one exemplary embodiment, a social networking company may be a tenant of the multi-tenant on-demand database service and may use the multi-tenant on-demand database service for customer support operations. The social networking company may receive cases regarding child endangerment in the form of case objects utilizing the multi-tenant on-demand database service. The social networking company may add a team to the case objects, such that members of the team may be automatically notified upon a change made to a case object. For example, the members of the team may include a filer of the case (e.g. who may or may not be a customer portal user), a legal department of the social networking company (e.g. who may or may not be a user of the multi-tenant on-demand database service), and the attorney general's office of the state in which the case was filed (e.g. who may be a contact).

Furthermore, as shown in operation 206, a role for each member is received. Each role may each indicate notification settings for the member associated with (e.g. assigned to) the role. For example, the role may indicate the circumstances under which the associated member is to receive a notification, such as whether the associated member is to receive a notification when a comment is posted to the object, when the status of the object is marked as closed, etc.). As another example, the role may indicate the communication channel (e.g. email, etc.) via which the associated member is to receive the notifications (e.g. by indicating the member address to which such communications are to be sent, etc.). Optionally, roles may each identify an object representative of the notifications settings for a member.

In one embodiment, the roles may be received from a manual entry by the tenant. In another embodiment, the roles may each be received via selection from a predefined list of roles available to be defined in the team (e.g. where the predefined roles are configured by an administrator). In yet another embodiment, the roles may be received as a group via selection of a predefined team object (e.g. a team object template already including member identifiers and associated roles).

In still yet another embodiment, the roles may be received as a result of executing a rule which indicates the roles to be defined for the members in the team. Optionally, the rule may indicate which role is to be defined for a particular member. Just by way of example, the rule may indicate that an owner of the object is to be automatically added to the team and assigned a role in which notifications of any change made to the object is sent to the owner, such that upon execution of the rule, a member identifier of such owner may be received along with a role assigned to such member which indicates that notifications of any change made to the object are to be sent to the owner.

In accordance with the exemplary embodiment described above in which the social networking company is a tenant of the multi-tenant on-demand database service and adds a team to the case objects, the social networking company may also define the roles for each of the members included in the team. For example, the legal department of the social networking company may be associated with a role in which it is notified of every comment or email pertaining to the case object. As another example, the attorney general's office may be associated with a role in which it is only notified when the case object is marked with a closed status.

As also shown, a team object is created using the identifiers of the members and the roles. See operation 208. In one embodiment, the team object may include therein the member identifiers. In another embodiment, the team object may include the roles. In yet another embodiment, the team object may include a mapping (e.g. assignment) of each member identifier to one of the roles. In this way, the team object may define the members of the team and the role of each member of the team.

As an option, once the team object is created the members of the team as defined by the team object may be automatically notified of their inclusion in the team. Furthermore, any members subsequently added to the team via the team object may also be automatically notified upon their inclusion in the team. In one optional embodiment, the notification may be generated via a notification template (e.g. email template) selected by the administrator. Of course, it should be noted that such notification may only be sent if the administrator selects a setting of the team object that such notification be automatically sent.

Still yet, as shown in operation 210, the team object is associated with the object. In one embodiment, the team object may be associated with the object by including a reference to the team object in the object. Of course, however, the team object may be associated with the object in any desired manner.

Once the team object is created and associated with the object, an entry may be added to a user interface of the multi-tenant on-demand database service (e.g. a user interface for managing the objects, a user interface managing an account of the user, etc.). In one embodiment, the entry may be selected by a user for receiving a report listing objects to which the user is included in an associate team object. In another embodiment, the entry may be selected by the user for receiving a report listing only objects with an open status to which the user is included in an associate team object. In yet another embodiment, the entry may be selected by the user for receiving a report listing each case object and a team object associated therewith.

As shown in decision 212, it is determined whether a notification is to be sent to the team. In one embodiment, the determination may be based on a determination of whether a change has been made to the object. For example, if a change has been made to the object, it may be determined that a notification is to be sent to the team. Thus, the notification may optionally include information describing the change made to the object (e.g. the type of change, the source of the change, the time of the change, etc.).

If it is determined that a notification is not to be sent to the team, the method 200 waits for a determination that a notification is to be sent to the team. If, however, it is determined that a notification is to be sent to the team, the members of the team are identified and the notification is sent to each member based on the roles. See operation 214.

For example, the members of the team may be identified by retrieving the member identifiers from the team object. Further, the role associated with each member identifier via the team object may be identified for determining the notification settings for each member of the team. In this way, the members of the team may be sent the notification if their associated notification settings indicate that the notification should be sent. Just by way of example, if it is determined a notification is to be sent to the team (decision 212) as a result of a particular type of change to the object and that a member of the team associated with the object is to receive notifications on that particular type of change to the object, then the member may receive the notification. In this way, members of the team associated with the object may be automatically sent a notification based on their role when a change to the object is detected.

Figure 3:
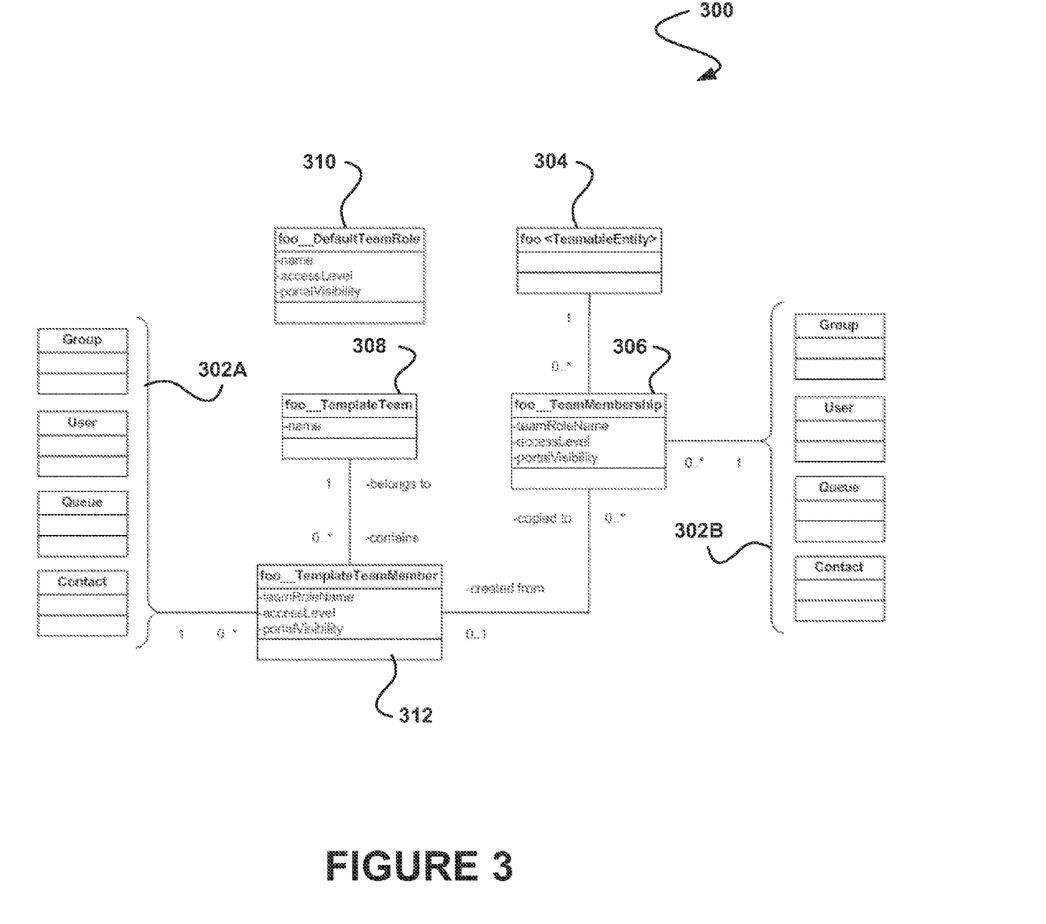
FIG. 3 shows a system for providing a team object in association with an object, in accordance with yet another embodiment.

FIG. 3 shows a system 300 for providing a team object in association with an object, in accordance with yet another embodiment. As an option, the system 300 may be implemented in the context of the functionality of FIGS. 1-2. Of course, however, the system 300 may be implemented in any desired environment. Again, the aforementioned definitions may apply during the present description.

As shown, a plurality of members 302A and 302B are included in tables based on a categorization of such members 302A and 302B. For example, members 302A and 302B that are contacts are included in a first table, members 302A and 302B that are queues are included in a second table, members 302A and 302B that are users are included in a third table, etc. The members 302A and 302B include those that are available of inclusion in a team object associated with a team.

As also shown, an object 304 is provided that is capable of having associated therewith a team object 306. The object 304 is defined as an entity capable of having a team associated therewith. For example, a setting of the object 304 may be selected which indicates that the object 304 is allowed to have a team associated therewith.

The team object 306 associated with the object 304 includes members 302A and 302B defined using multiple different techniques. In one embodiment, the team object 306 includes identifiers of members selected (e.g. by a user) directly from the members 302B. In another embodiment, the team object 306 includes identifiers of members that are automatically included in a predefined team object 308, for example, by virtue of the team object 306 referencing the predefined team object 308.

As shown, the predefined team object 308 includes identifiers of members selected (e.g. by a user) directly from the members 302A. Thus, the predefined team object 308 includes an identifier (e.g. name) of each member included there team represented by the predefined team object 308. A member object 312 representing each member 302A is referenced by the member identifier included in the predefined team object 308. Thus, the team object 306 may be automatically populated with members based on the member identifiers included in the predefined team object 308. Further, changes to the predefined team object 308 may be automatically propagated to the team object 306.

The member object 312 includes a role assigned to the member represented by the member object 312. The role may be selected from a plurality of predefined role objects 310. Upon selection of the role from the predefined role objects 310, characteristics of the role may be automatically populated into the member object 312, and thus further populated into the team object 306. The characteristics may include a name of the role, an access level (e.g. permissions) associated with the role, visibility of the member assigned to the role, notification settings for the member assigned to the role, etc. To this end, the team object 306 may be automatically populated with the roles indicated in the member objects 312 based on the member identifiers included in the team object 312 (e.g. as populated from the predefined team object 308 and directly from the members 302B), for mapping each of such member identifiers with the role associated therewith, as defined by the member objects 312.

System Overview

Figure 4:
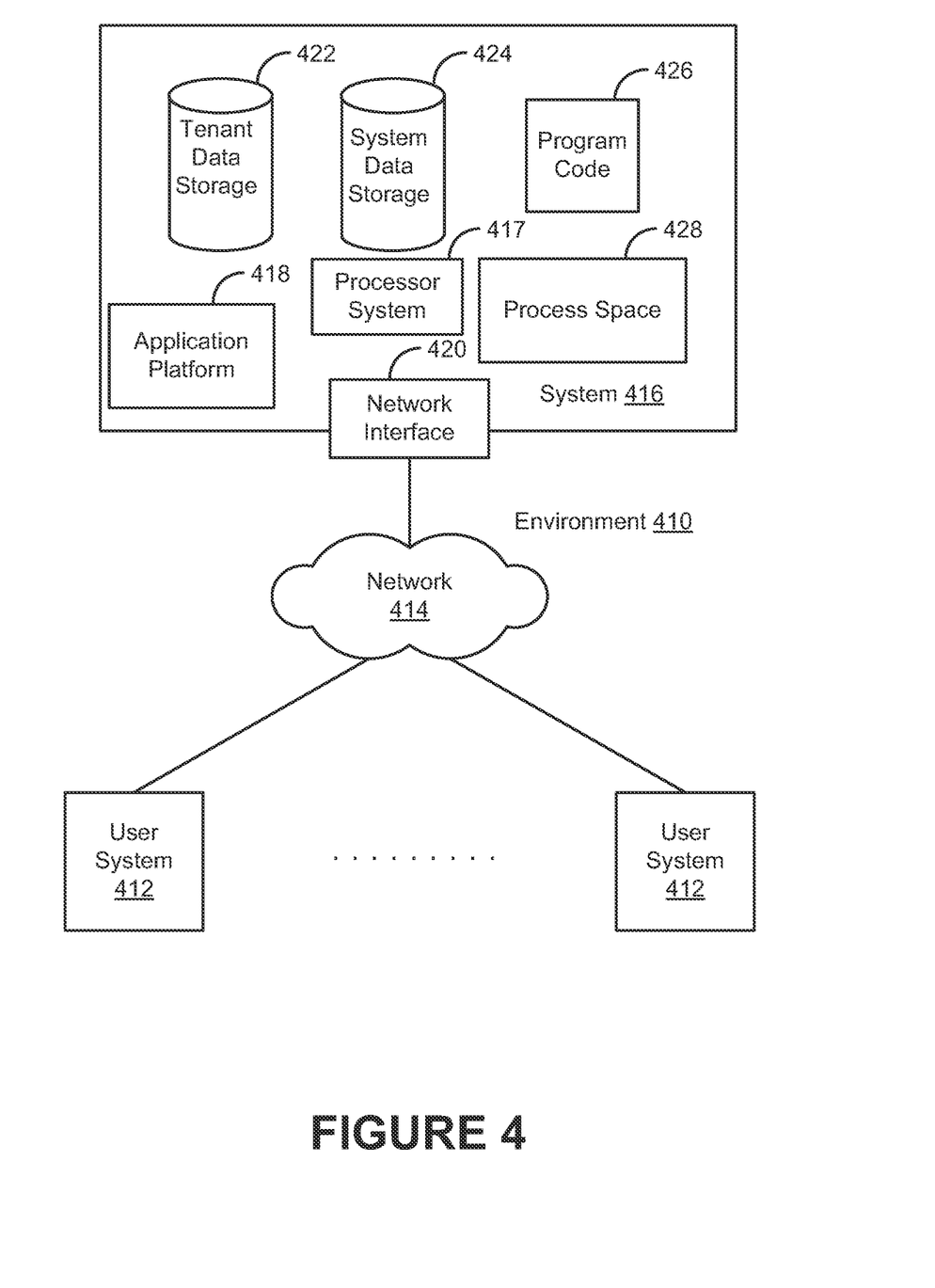
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
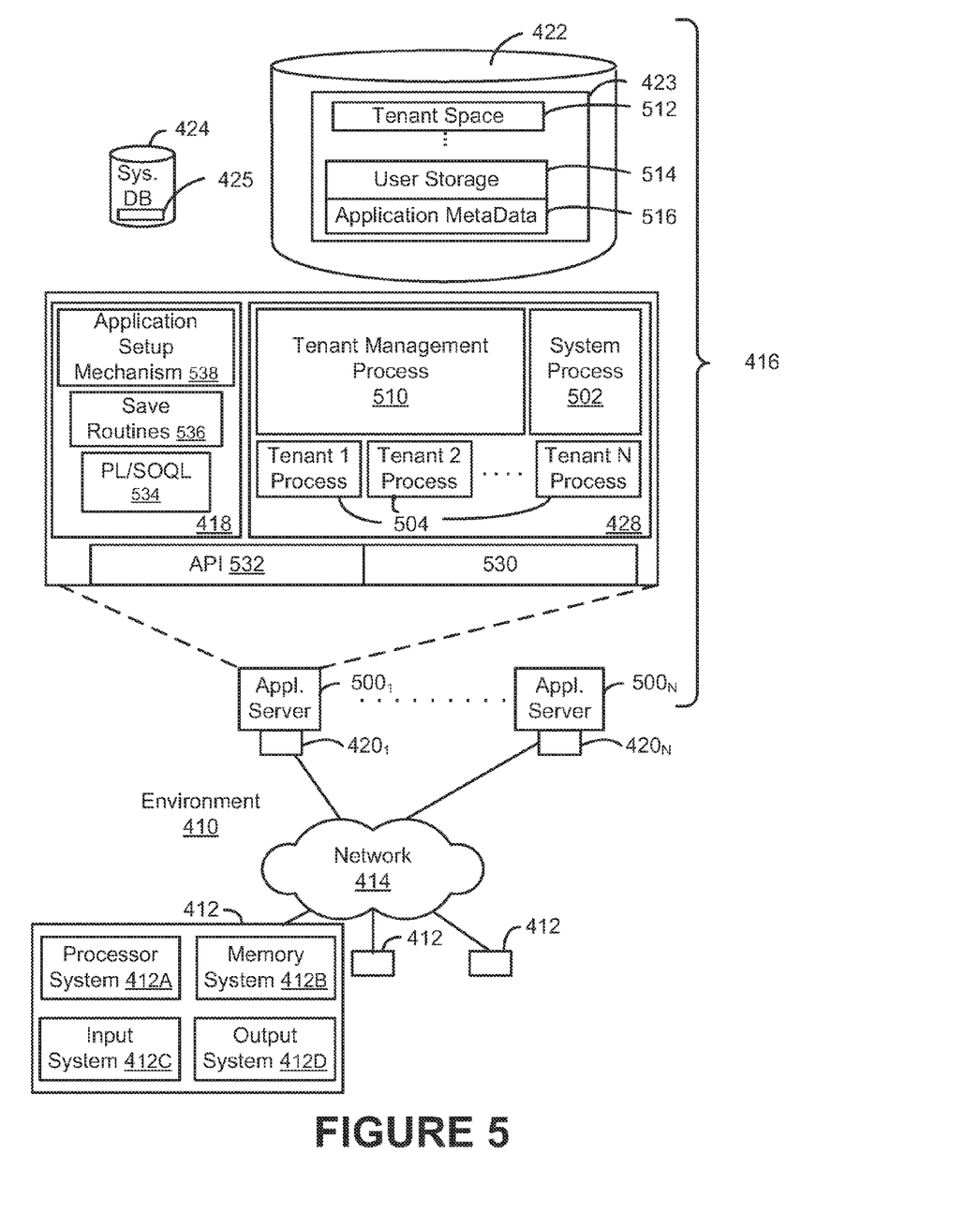
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, ca phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (MID), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each NITS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PUSOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g. one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/001.0243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to cause a computer to implement a method comprising:

providing a multi-tenant on-demand database system having hardware and software shared by multiple tenants over a network, wherein the multi-tenant on-demand database system stores a first object for a first one of the tenants and wherein a setting of the first object indicates that the first object is allowed to have a team associated therewith;

receiving, from a user associated with the first tenant, a request to add a first team to the first object, wherein the first team includes at least two members, the at least two members including a first member that is associated with the first tenant by being a user of the first tenant and being provided access to the multi-tenant on-demand database system via the first tenant, and a second member that is not associated with the first tenant and that is a contact of the first member, wherein:

full access is provided to the first member based on the first member being the user of the first tenant, the full access including permission for the first member to define members of the first team, and less than full access is provided to the second member based on the second member being the contact of the first member, the less than full access denying the second member permission to define members of the first team;

configuring in the multi-tenant on-demand database system a first team object, wherein the first team object includes an identifier of the at least two members of the first team;

associating the first team object with the first object for adding the first team to the first object, by including a reference to the first team object in the first object;

notifying at least one of the first member and the second member of the first team by:

identifying the first team object associated with the first object, in response to the identification of the first team object associated with the first object, identifying from the first team object the at least one of the first member and the second member of the first team, and notifying the identified at least one of the first member and the second member of the first team, such that the at least one of the first member and the second member of the first team is notified based on the at least one of the first member and the second member being identified from the first team object.

2. The computer program product of claim 1, wherein the first object includes a data object.

3. The computer program product of claim 1, wherein each member includes at least one of a user of the multi-tenant on-demand database service, a contact, and a queue.

4. The computer program product of claim 1, wherein the first team object is configured by defining the first team requested to be added to the first object.

5. The computer program product of claim 1, wherein the computer program product is operable such that the first team object is configured from a predefined team object, the predefined team object including a template of members and roles assigned to each of the members.

6. The computer program product of claim 5, wherein changes made to the predefined team object are automatically propagated to the configured first team object.

7. The computer program product of claim 1, wherein the first team object is configured based on predefined assignment rules indicating for the first object a predefined member to be automatically included in the first team object.

8. An apparatus, comprising:
a hardware processor for:
providing a multi-tenant on-demand database system having hardware and software shared by multiple tenants over a network, wherein the multi-tenant on-demand database system stores a first object for a first one of the tenants and wherein a setting of the first object indicates that the first object is allowed to have a team associated therewith;

receiving, from a user associated with the first tenant, a request to add a first team to the first object, wherein the first team includes at least two members, the at least two members including a first member that is associated with the first tenant by being a user of the first tenant and being provided access to the multi-tenant on-demand database system via the first tenant, and a second member that is not associated with the first tenant and that is a contact of the first member, wherein:

full access is provided to the first member based on the first member being the user of the first tenant, the full access including permission for the first member to define members of the first team, and less than full access is provided to the second member based on the second member being the contact of the first member, the less than full access denying the second member permission to define members of the first team;

configuring in the multi-tenant on-demand database system a first team object, wherein the first team object includes an identifier of the at least two members of the first team;

associating the first team object with the first object for adding the first team to the first object, by including a reference to the first team object in the first object;

notifying at least one of the first member and the second member of the first team by:

identifying the first team object associated with the first object, in response to the identification of the first team object associated with the first object, identifying from the first team object the at least one of the first member and the second member of the first team, and notifying the identified at least one of the first member and the second member of the first team, such that the at least one of the first member and the second member of the first team is notified based on the at least one of the first member and the second member being identified from the first team object.

9. The apparatus of claim 8, wherein the processor is coupled to memory via a bus.

10. A method, comprising:
providing a multi-tenant on-demand database system having hardware and software shared by multiple tenants over a network, wherein the multi-tenant on-demand database system stores a first object for a first one of the tenants and wherein a setting of the first object indicates that the first object is allowed to have a team associated therewith;

receiving, from a user associated with the first tenant, a request to add a first team to the first object, wherein the first team includes at least two members, the at least two members including a first member that is associated with the first tenant by being a user of the first tenant and being provided access to the multi-tenant on-demand database system via the first tenant, and a second member that is not associated with the first tenant and that is a contact of the first member, wherein:

full access is provided to the first member based on the first member being the user of the first tenant, the full access including permission for the first member to define members of the first team, and less than full access is provided to the second member based on the second member being the contact of the first member, the less than full access denying the second member permission to define members of the first team;

configuring in the multi-tenant on-demand database system a first team object, wherein the first team object includes an identifier of the at least two members of the first team;

associating the first team object with the first object for adding the first team to the first object, by including a reference to the first team object in the first object;

notifying at least one of the first member and the second member of the first team by:

identifying the first team object associated with the first object, in response to the identification of the first team object associated with the first object, identifying from the first team object the at least one of the first member and the second member of the first team, and notifying the identified at least one of the first member and the second member of the first team, such that the at least one of the first member and the second member of the first team is notified based on the at least one of the first member and the second member being identified from the first team object.

11. The computer program product of claim 1, wherein the first object is of a particular type.

12. The computer program product of claim 11, wherein the first object stores data of the particular type.

13. The computer program product of claim 1, wherein based on the association between the first team object and the first object, a selectable entry is provided on a user interface of the multi-tenant on-demand database system, and when the selectable entry is selected by at least one member of the first team, a report is provided to the at least one member listing at least in part the first object.

14. The computer program product of claim 13, wherein the report lists each object having an associated team object that includes the identifier of the at least one member.

15. The computer program product of claim 1, wherein the first object is a table.

16. The computer program product of claim 1, wherein the first team object further includes an assignment of at least one role to each of the at least two members of the first team, wherein each of the at least two members of the first team is capable of being assigned a different role.

17. The computer program product of claim 16, wherein each role defines notification settings for members assigned to the role and permissions with respect to the first object.

* * * * *